United States Patent
Meisler et al.

[15] 3,691,779
[45] Sept. 19, 1972

[54] HYDROGEN PURIFICATION

[72] Inventors: Joseph Meisler, Teaneck, N.J.; Gregory C. Banikiotes, Seaford; Edward Harold Van Baush, Pearl River, both of N.Y.

[73] Assignee: Hydrocarbon Research, Inc., New York, N.Y.

[22] Filed: Dec. 29, 1969

[21] Appl. No.: 888,424

[52] U.S. Cl. ............................62/23, 62/18, 62/22, 62/31, 62/39
[51] Int. Cl. ........................F25j 1/02, F25j 3/06
[58] Field of Search............62/18, 22, 23, 24, 27, 28, 62/39; 55/62

[56] References Cited

UNITED STATES PATENTS

| | | | |
|---|---|---|---|
| 3,352,121 | 11/1967 | Biskis | 62/18 |
| 3,430,418 | 3/1969 | Wagner | 55/62 |
| 3,543,529 | 12/1970 | Knapp | 62/23 |
| 3,011,589 | 12/1961 | Meyer | 62/18 |
| 3,085,379 | 4/1963 | Kiyonaga | 55/62 |
| 3,400,546 | 9/1968 | Karwat | 62/18 |
| 3,553,972 | 1/1971 | Markbreiter | 62/22 |

*Primary Examiner*—Norman Yudkoff
*Assistant Examiner*—A. F. Purcell
*Attorney*—Nathaniel Ely and Bruce E. Hosmer

[57] ABSTRACT

A high purity, 97 to 99.9 percent hydrogen product is obtained by using a separation process consisting of a low temperature refrigeration system operating below 120°R, and an adsorption system operating on an adiabatic pressure-swing principle within the temperature range of 200° to 140°R. The hydrogen-rich feed gas with methane, nitrogen, carbon monoxide and traces of argon, oxygen, carbon dioxide, and low boiling hydrocarbons passes as a pressurized gaseous stream through a series of cooling and condensation stages having successively lower temperatures. Hydrogen containing vapor and condensate are separated between cooling stages. The hydrogen-enriched vapor stream leaving the exchanger cooling system is passed to an adsorption system for further upgrading. A portion of the upgraded product from the adsorption system is pressure reduced in an expander system, passed through at least one of the refrigeration stages to provide the net refrigeration needed in the cooling unit, and is thereafter used to purge and regenerate the adsorption system.

16 Claims, 1 Drawing Figure

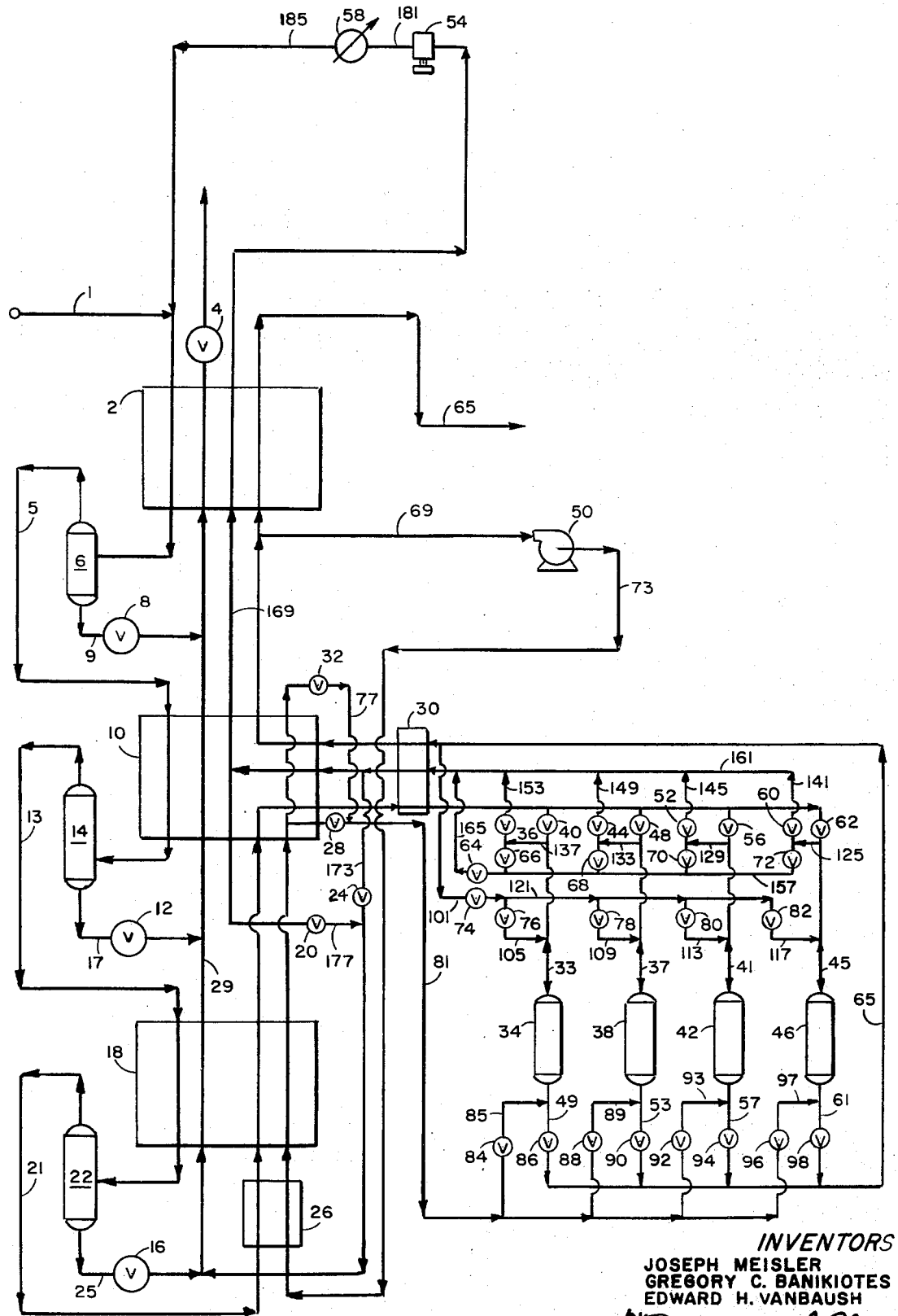

HYDROGEN PURIFICATION

BACKGROUND OF INVENTION

Methods for upgrading a hydrogen-rich gas to produce a hydrogen product gas of high purity are known in the art. Warm temperature processes have been used to separate high boiling impurities such as carbon dioxide, high boiling hydrocarbons, hydrogen sulfide, moisture, and the like; cryogenic systems have been used to remove low boiling impurities such as methane, nitrogen and carbon monoxide.

Cryogenic processes such as disclosed in the U.S. Pat. Nos. 3,223,745 and 3,359,744 have shown methods for upgrading a hydrogen-rich gas to an impurity level of 3 to 10 percent from a feed originally containing 40 to 50 percent impurities, (the percent figures in this application are mole percents) consisting mostly of low boiling hydrocarbons and nitrogen and carbon monoxide. For such purification, stage cooling and condensation processes are generally used to cool the feed to a required temperature level of 220° to 200° R since this method provides an optimal system design.

When product purity in excess of 97 percent is required, stage cooling and condensation techniques are generally not adequate, especially if considerable quantities of nitrogen and carbon monoxide are present in the feed gas, and particularly on a commercial scale. An absorption process using liquid methane and propane is described in U.S. Pat. No. 3,073,093. This method makes it possible to obtain product purities with less than 1 ppm of contaminants. Liquefied hydrogen must usually be purified to this extent but such purity is generally not necessary for most applications where hydrogen is utilized as chemical reactants having purities in the range of 97 to 99.9 percent.

The present invention fills the process design gap now existing between an efficient method of producing ultra-high purity product as described in U.S. Pat. No. 3,073,093 and the many more conventional methods of producing 97 percent purity or less. Specifically, the present invention discloses an optimal process design for producing a hydrogen gas product within the 97 to 99.9 percent purity range.

SUMMARY OF THE INVENTION

The present invention preferably relates to an integrated cryogenic system for obtaining a hydrogen stream with a purity between about 97 and about 99.9 percent. An improved process is disclosed for separating hydrogen in a state of high purity from a mixture rich in nitrogen, methane and carbon monoxide, and containing trace amounts of low boiling hydrocarbons, argon and oxygen by the combined use of one or more heat exchangers and one or more adsorbers. In the present invention, a pressurized feed gas admixed with a hydrogen-rich nitrogen containing recycle stream is processed through a succession of cooling stages each one being at a lower temperature than the previous stage. After isenthalpic expansion to low pressure, each condensate stream is returned through the preceding heat exchange stages in order to provide the cooling to the feed stream through indirect heat transfer. The hydrogen-enriched vapor effluent resulting from the series of cooling and condensation stages is partially preheated by indirect heat transfer with the feed and passed to an adsorption system for further purification. The purified effluent leaves the purification system after indirect heat exchange with the feed. A fraction of the purified hydrogen effluent leaving the adsorption system is expanded isentropically to the lowest temperature level required by the purification system and, after being heated to adsorber temperature by indirect heat transfer with the feed stream, this hydrogen fraction is used to regenerate one of the beds in the adsorber system. A fraction of the contaminant-laden regenerant stream leaving the adsorber is admixed with at least one condensate stream for the purpose of enabling it to cool the feed stream to the desired temperature level. The remainder of the regenerant stream is warmed to ambient temperature by indirect heat transfer with the feed stream, and after recompression to feed pressure it is admixed with the feed and reenters the cooling system.

Thus the present invention utilizes the feed stream to provide both the net refrigeration needed in the adsorption system as well as the regenerant for the adsorption system. These two necessary functions are, therefore, performed without the use of either an external supply of refrigeration or an external regenerating system and additionally without reduction of product recovery thereby making this a self-sustaining system.

DESCRIPTION OF THE DRAWING

The drawing is a schematic view of the principal elements of a cryogenic separation process suitable for adsorption purification of hydrogen.

DESCRIPTION OF THE PREFERRED EMBODIMENT

In accordance with this invention, a preferred embodiment will be described for the purification of a hydrogen-containing feed stream. In a cryogenic system for such purification, it is preferred to operate so as to prevent the formation of any solids within the system.

In an adsorption system as herein described, the refrigeration requirement is minimized by maintaining the temperature of the system during regeneration as nearly as possible to the temperature of the system during adsorption. At the same time, in order to minimize temperature swings in both the adsorption and cooling systems, there is employed a heat exchange between the entering and leaving streams of these systems.

A first portion of this invention comprises the cryogenic purification to about 97 percent of a gaseous feed stream containing between about 30 and about 70 percent hydrogen.

A hydrogen containing gaseous feed at a temperature of about 100°F and at a pressure between about 300 and about 900 psia is fed by line 1 through heat exchange zone 2 and is thereby cooled to about 210°R. Ethylene plant off gas, and ammonia synthesis purge refinery off gas are possible sources of the gaseous feed. The feed could contain such contaminants as nitrogen, methane, ethane, ethylene, and trace oxygen, all of which are condensible at low temperature levels.

The cooled feed enters separation zone 6 through line 1 and is separated into a gaseous overhead effluent which leaves by line 5 and a liquid bottoms effluent, rich in methane and $C_2$ components which leave the separation zone 6 through line 9. The liquid bottoms effluent contains almost all of the ethylene and ethane contaminants in the feed stream. The condensate in line 9 is pressure reduced to about 25 psia by expansion means 8 and is returned through heat exchange zone 2 by line 29 to provide refrigeration for the gaseous feed in line 1.

The overhead effluent from separation zone 6 in line 5 is passed through heat exchange zone 10 into separation zone 14. The gaseous effluent in line 5 is cooled to about 140°R as it passes through heat exchange zone 10. The gaseous overhead effluent in separation zone 14 leaves via line 13 and contains about 95 percent hydrogen. The liquid bottoms effluent passes through line 17 and contains methane, nitrogen, carbon monoxide, and dissolved hydrogen. The bottoms in stream 17 are expanded to about 25 psia by expansion means 12 and are returned back through heat exchange zones 10 and 2 through line 29 to provide cooling for the incoming feed.

The overhead in line 13 passes through heat exchange zone 18 where its temperature is further reduced to about 120°R and it then enters separation zone 22. The gaseous effluent in separation zone 22 leaves via line 21 and contains about 97 percent hydrogen. The liquid bottoms effluent passes through line 25 and contains nitrogen, carbon monoxide, and residual methane. The bottoms stream in 25 passes through expansion means 16 and then by line 29 through heat exchange zones 18, 10 and 2 to provide further cooling for the incoming feed. The liquid bottoms effluent from separation zone 22 passing through line 25 contains predominantly nitrogen. Line 25, in passing through expansion means 16, is pressure reduced to about 25 psia. Line 29 contains the expanded condensate bottoms fractions from separation zones 22, 14 and 6 and these fractions constitute the fuel gas effluent of this process. As a separate embodiment, the expanded condensate bottoms fractions can be recovered separately thereby eliminating unneeded subsequent separation for recovery of the components contained therein.

The gaseous effluent from separation zone 22 in line 21 contains about 97 percent hydrogen, 2 percent nitrogen and lesser amounts of methane and carbon monoxide.

The overhead vapor from separation zone 22 in line 21, at about 120°R, is passed through heat exchange zones 26, 18, 10 and 30, the results of which raises the temperature to about 160°R. It is then ready to be passed to the adsorption system which is used to upgrade the overhead stream to produce a high purity hydrogen stream containing about 99.9 percent hydrogen by volume and a residual amount of unadsorbed contaminants consisting of nitrogen and trace amounts of carbon monoxide and methane.

Heat exchange zone 26 acts as a temperature equalizing exchanger. Product hydrogen in line 21 passes in parallel with the low pressure purified hydrogen in line 73 through heat exchange zone 26. This equalizing heat exchange reduces the large temperature difference existing between line 73 coming from expansion means 50 and line 13 when they pass in counter current flow in heat exchange zone 18. Such heat exchange means avoids producing excessively cold wall temperatures where line 13 contains $CH_4$ below the normal freezing temperature, which low temperatures would cause to freeze. Furthermore the use of heat exchange zone 26 increases the efficiency of heat transfer between feed and effluent products in zone 18 because a positive temperature differential is established between each stream.

Heat exchange zone 30 serves to minimize the temperature variations which occur in the product hydrogen stream 65 leaving the adsorption system by cooling it in indirect heat exchange with the colder hydrogen feed to the adsorption zone in 21 and the colder regenerant stream leaving in 161. This method maintains a constant temperature in the hydrogen product returning to the exchanger train thereby increasing its efficiency for cooling the feed stream to the required level.

The adsorption system has a limited capacity to adsorb contaminants. When this capacity has been reached the adsorption medium contained in the adsorption vessels must be purged of adsorbed contaminants in order to prepare the medium for further adsorption. The purging and adsorption steps are mutually exclusive. A single adsorption vessel could be used in the present process if a non-continuous operation were not objectionable. However, it has been found to be more economical to provide at least four adsorption vessels.

In addition to providing for a continuous process, it has been discovered in the practice of this invention that by using four adsorption beds in a programed adsorption cycle, it is possible to control and significantly reduce any pressure fluctuations throughout the purification system. Such control of pressure fluctuations means that while one adsorption bed is adsorbing, the remaining three beds are simultaneously undergoing the other stages of the adsorption cycle, consisting of depressurization, regeneration and pressurization respectively, as hereinafter described. Each of these operations take place in about a 30 minute time period. In this preferred description of the process four adsorption vessels are disclosed to clearly illustrate and set forth the adiabatic pressure-swing purging process of this invention.

In the adiabatic pressure-swing principle, the adsorption cycle is operated so that the regeneration of each bed is effected partially by reducing the pressure in the vessel, and partially using a low-pressure contaminant-free hydrogen stream to purge residual contaminants from the beds. It is to be understood that more than four such adsorption vessels can be used in practicing the present invention with a properly programed adsorption cycle.

The four stages of the adsorption cycle will be separately described. Each stage described, i.e., adsorption, depressurization, desorption and pressurization will refer to the four adsorption zones 34, 38, 42 and 46; but it is to be understood that in actual operation generally at any time, each adsorption zone is operating on a different stage of the adsorption cycle. However, when an adsorption cycle is almost complete, the related adsorption zone stages, adsorption and pressurization, desorption and depressurization, are operated with an overlap so as to insure a smooth transition within the system thereby helping to avoid any pressure surges.

It has been discovered that the flow from the system on pressurization must balance the flow to the system on depressurization in order to maintain the temperature profile of the heat exchanger train. The more rapidly the pressurization-depressurization stages are operated, the greater the unbalancing of the above mentioned flows. Therefore the pressurization-depressurization stages must be operated over an extended period of time to provide a steady product flow thereby maintaining the exchanger capacity and the compression equipment at operating levels. This is best done by fixing the adsorbing cycle at preferably 30 minutes. At this rate the adsorption system becomes completely steady but for the last fraction of the cycle when the adsorption stage volume can act as a surge drum to dampen any pressure fluctuation effects.

In a bed adsorbing the contaminants from the contacting hydrogen stream, the gaseous effluent in stream 21 passes through valve 40, 48, 56 or 62, then through line 33, 37, 41 or 45 respectively to undergo adsorption in adsorption zone 34, 38, 42 or 46 respectively. The contaminants are adsorbed on the adsorbent bed for about 30 minutes. Adsorbents that are suitable for use in the adsorption zone are silica gel, activated carbon and molecular sieves. The adsorption takes place between about 140°R and about 175°R and at a pressure between about 300 and about 900 psia.

The purified hydrogen stream leaves the adsorption zone 34, 38, 42 or 46 through line 49, 53, 57 or 61 and valve 86, 90, 94 or 98 respectively. The purified hydrogen streams pass out of the system in line 65. The residual impurities consist of nitrogen, carbon monoxide, and methane. The purified hydrogen in line 65 passes through heat exchange zone 30, 10 and 2 prior to leaving the system. The quality of this product stream can be further improved by heating it to 600°F. and methanating it at this temperature in a suitable reaction zone, which is not shown. This treatment will reduce the carbon monoxide level to about 1 part per million.

Prior to passing line 65 through heat exchange zone 2, a portion of the purified hydrogen is withdrawn in line 69. Line 69 passes through expansion means 50 and enters line 73 at about 100°R. Line 73 passes through heat exchange zones 26, 18 and 10 prior to serving as the regenerating means for the adsorption zones. In this way, line 73 provides the net refrigeration needed to produce the low temperature required in the cooling stages of the system. Line 73 then enters the adsorption zones.

The depressurization stage of the adsorption cycle reduces the pressure in adsorption zone 34, 38, 42 or 46 from operating pressure to about 35 psia. Depressurization takes place through line 33, 37, 41 or 45, line 137, 133, 129 or 125, valve 66, 68, 70 or 72 and line 157, valve 64 and line 165 at which point it joins line 161 for passage out of the system as previously described.

The low pressure purified hydrogen stream in line 73 is used to regenerate the adsorption zones 34, 38, 42 and 46 when the adsorption bed has been sufficiently contaminated. At that time, the valves allowing the gaseous effluent in line 21 to pass through the bed, as previously described, will be closed. The hydrogen product in line 73 will pass to either adsorption zone 34, 38, 42 or 46 through valve 84, 88, 92 or 96 and line 85, 89, 93 or 97 respectively. This manner of adsorption-desorption is termed adiabatic "pressure swing." The term "pressure swing" is meant to encompass the pressure variation between the purging stream and the stream from which contaminants are adsorbed. The adsorption zone which was slightly heated during the adsorption stage is cooled to operating temperature during the regeneration stage.

When the contaminants have been desorbed from adsorption bed 34, 38, 42 or 46, the contaminated hydrogen stream passes through line 33, 37, 41 or 45; and line 137, 133, 129 or 125; and valve 36, 44, 52 or 60; and line 153, 149, 145 or 141 respectively to line 161. Line 161 passes through heat exchange zones 30 and 10 and then joins line 169 to pass through heat exchange zone 2 to provide cooling for the feed. Line 169 then passes through compression means 54, line 181, cooling zone 58 and line 185 and admixes with the feed stream in line 1 as the process recycle stream.

This recycle of the regeneration gas to the feed allows the recovery of the hydrogen contained therein. Additionally, it has been discovered that the recycle of the gas used for the regeneration of the adsorption beds to the cooling and condensing system allows for the rejection of the net nitrogen, carbon monoxide and methane contaminants accumulated in the purification system.

In the adsorption cycle, the pressurization stage uses product hydrogen to bring the pressure in adsorption zone 34, 38, 42 or 46 to operating pressure so that the regenerated adsorption bed is now ready for the adsorption stage, thereby completing the programed adsorption cycle. The pressurization stage takes purified hydrogen from line 65 through line 101, valve 74 and line 121 which then pressurizes sealed adsorption zone 34, 38, 42 or 46 by passing through valve 76, 78, 80 or 82; line 105, 109, 113 or 117; and line 33, 37, 41 and 45. The pressurized adsorption zone is now suitable for beginning the adsorption cycle again.

As can be seen, the present process provides for the upgrading of a hydrogen feed stream to about 99.9 percent hydrogen by volume or greater by means of the combination of cryogenic and adsorption techniques.

Having thus described the invention in general terms, reference is now made to a specific example which has been carried out in accordance with the techniques of the present invention and which should not be construed as unduly limiting thereof.

EXAMPLE

The following example demonstrates the applicability and efficiency of the present invention for separating a gaseous mixture in which hydrogen is the major constituent and which also contains various amounts of light hydrocarbons, nitrogen, carbon monoxide and argon.

| Feed Gas: | Flow | – 18 MM SCFD | |
|---|---|---|---|
| | Pressure | – 540 psia | |
| | Temperature | – 100°F. | |
| | Composition: | | |
| | $H_2$ | 57 | Mole Percent |
| | Argon | 0.1 | " " |
| | Nitrogen | 17.0 | " " |
| | CO | 3.0 | " " |
| | $CH_4$ | 22.0 | " " |
| | $C_2H_6$ | .2 | " " |
| | $C_2H_4$ | 0.7 | " " |

The vapor stream leaving the last cooling stage separator at about 120°R contains about 98 percent hydrogen, and a remainder consisting of about 1.9 percent nitrogen, 0.10 percent CO and trace amounts of $CH_4$ and argon. A four bed adsorption system is used to purify the 98 percent hydrogen stream to produce a product of at least 99.7 percent hydrogen content with a recovery of at least 92 percent of the hydrogen in the feed.

Each adsorber bed is 54 inch diameter by 28 feet deep filled with a "high capacity" grade silica gel adsorbent, of 6 to 10 mesh size.

The sequence of operation for each of the four beds is the following:

1. Bed (1) adsorbs contaminants for about 30 minutes at operating pressure and at an average temperature of minus 285°F.
2. Simultaneous with adsorption in bed (1), the following sequence of operations occur during the 30 minute period:
   a. Bed (4) is depressured to about 2 atmospheres.
   b. Bed (3) is purged of contaminants at about 2 atmospheres by a low pressure purified hydrogen stream. Bed (3) which was slightly heated during the "adiabatic" adsorption period is cooled to operating temperature during the "adiabatic" desorption period.
   c. Regenerated bed (2) is pressurized to operating pressure with purified hydrogen and becomes operable as a fresh adsorber bed when the time sequence for adsorber bed (1) is completed.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

We claim:

1. An integrated cryogenic-adsorption process for the purification of hydrogen which comprises:
   a. a low temperature self-sustaining cooling and condensing separation system operating so as to provide for the step-wise removal of low boiling hydrocarbons, methane, nitrogen, carbon monoxide, traces of argon and traces of oxygen from a hydrogen-containing gas feed through a series of cooling and condensing separation stages having successively lower temperatures wherein the lowest temperature reached is about 120°R;
   b. operating the system between about 300 and about 900 psia;
   c. removing a liquid effluent at each separation stage and expanding said effluent for use in indirect heat exchange with the streams coming from the previous steps in the system;
   d. feeding the hydrogen-enriched vapor stream from the last separation stage to an adsorption system wherein said vapor stream is passed in parallel indirect heat exchange with the regenerant stream for said adsorption system prior to passing each stream to said adsorption system and wherein said vapor stream prior to entering said adsorption system also passes in indirect heat exchange with the product hydrogen and spent regenerating gas leaving said adsorption system;
   e. maintaining the adsorption system at a temperature between about 160°R and 200°R and at a pressure between 300 and about 900 psia;
   f. operating said adsorption system such that pressure fluctuations throughout the process are minimized whereby the separate steps of adsorbing, depressurizing, desorbing and pressurizing take place with an overlapping of said steps to thereby insure smooth transitions between steps of different pressures;
   g. adsorbing, depressurizing, desorbing and pressurizing in the adsorption system under conditions such that the system is an adiabatic pressure-swing system;
   h. expanding the effluent streams from the units comprising the system so as to provide by indirect heat exchange the cooling requirements for the operation of the cryogenic process;
   i. recovering a gaseous hydrogen-rich product stream containing about 97 to 99.9 percent hydrogen.

2. The process of claim 1 wherein a portion of the hydrogen-rich product stream is expanded to a pressure of about 35 psia to serve as the regenerating stream used in the adsorption system.

3. The process of claim 1 wherein the adsorption system comprises four separate adsorption beds.

4. The process of claim 1 wherein the operating pressure is 600 psia.

5. The process of claim 2 wherein the regenerating stream, after leaving the adsorption system, is recycled through the separation system for removal of contaminants therefrom thereby maximizing the purified hydrogen product yield.

6. In an integrated cryogenic-adsorption purification of a crude hydrogen stream containing contaminants selected from the group consisting of low boiling hydrocarbons, nitrogen, carbon monoxide, traces of argon and traces of oxygen to produce a purified hydrogen stream having in excess of 97 percent hydrogen which comprises a low temperature self-sustaining system including a series of cooling and condensing separation stages having successively lower temperatures wherein a liquid effluent is removed at each separation stage and expanded for use in indirect heat exchange with other streams coming from the previous steps in the system and wherein the hydrogen-rich vapor stream from the last separation stages enters an adsorption system wherein the improvement comprises:
   a. feeding the hydrogen-enriched vapor stream from the last separation stage to an adsorption system wherein said vapor stream is passed in parallel indirect heat exchange with the regenerant stream for said adsorption system prior to passing each stream to said adsorption system and wherein said vapor stream prior to entering said adsorption system also passes in indirect heat exchange with the product hydrogen and spent regenerating gas leaving said adsorption system;
   b. adsorbing, depressurizing, desorbing and pressurizing in the adsorption system under conditions of adiabatic pressure-swing conditions;
   c. operating said adsorption system such that pressure fluctuations throughout said process are minimized whereby the separate steps of adsorbing, depressurizing, desorbing and pressurizing take place with an overlapping of said steps to thereby insure smooth transitions between steps of different pressures;

d. expanding the effluent streams from the adsorption system units to supplement the cooling requirements for the operation of the cryogenic process;

e. recovering a gaseous hydrogen-rich product stream containing about 97 to 99.9 percent hydrogen.

7. The process of claim 6 wherein a portion of the hydrogen-rich product stream is used for desorbing after which it is recycled to the separation system for maximizing the yield of hydrogen.

8. An integrated cryogenic adsorption process for the purification of hydrogen by a low temperature, self-sustaining cooling and condensing separation system operating so as to provide for the stepwise removal of low boiling hydrocarbons, methane, nitrogen, carbon monoxide, traces of argon and traces of oxygen from a hydrogen containing gas feed through a series of cooling and condensing separation stages having successively lower temperatures wherein the lowest temperature reached is about 120°R thence through an adiabatic pressure-swing adsorption system maintained at a temperature of between about 160°R and 200°R and at a pressure between 300 and about 900 psia such that pressure fluctuations are minimized which comprises:

a. passing said hydrogen feed through a first heat exchange means thereby cooling said feed;

b. passing said cooled feed to a first separation zone;

c. removing a first liquid bottoms containing methane and heavier hydrocarbons, expanding said first liquid bottoms and passing said expanded first liquid bottoms reversely through said first heat exchange means;

d. removing said first separation zone a first vaporous overhead, passing said first vaporous overhead through a second heat exchange means thereby cooling said first overhead and passing said cooled first overhead to a second separation zone;

e. removing a second liquid bottoms containing nitrogen, carbon monoxide and residual hydrocarbons from said second separation zone expanding said second bottoms and passing said expanded second bottoms reversely through said first and said second heat exchange means;

f. removing a second vaporous overhead containing about 95 percent hydrogen, from said second separation zone passing said second overhead through a third heat exchange means thereby cooling said second overhead and passing said cooled second overhead to a third separation zone;

g. removing a third liquid nitrogen rich bottoms from said third heat exchange zone expanding said third bottoms and passing said expanded third bottoms reversely through said third and said second and said first heat exchange means;

h. removing a third overhead containing about 97 percent hydrogen from said third separation zone and passing said third overhead reversely through said third and said second heat exchange means;

i. passing said third overhead from said second heat exchange means through a fourth heat exchange means;

j. passing said third overhead from said fourth heat exchange means through an adsorption zone;

k. removing a purified hydrogen stream containing about 97 to 99.9 percent by volume of hydrogen from said adsorption zone passing said purified stream reversely through said fourth and said second and said first heat exchange means;

l. depressurizing said adsorption zone to reduce the pressure therein to about that of the expanded recycled purified hydrogen;

m. recycling a portion of said purified hydrogen stream leaving said second heat exchange means, expanding said recycled hydrogen, passing said recycled hydrogen reversely through said third and said second heat exchange means, passing said recycled hydrogen reversely through said depressurized adsorption zone to desorb the nitrogen impurities, removing an impure recycled hydrogen stream from said adsorption zone passing said impure stream reversely through said fourth and said second and said first heat exchange means and recycling said impure stream to be combined with said hydrogen feed for removal of the nitrogen impurities therefrom;

n. pressurizing said adsorption zone; and n. recovering said purified high pressure hydrogen.

9. The process of claim 8 wherein said third overhead and said recycled hydrogen are passed indirectly in parallel through a fifth heat exchanger before passing reversely through said third and said second heat exchangers.

10. The process of claim 8 wherein said depressurization pressure in said adsorption zone is about 35 psia.

11. The process of claim 8 wherein there are four adsorption zones being operated in cycles of about 30 minutes wherein one adsorbs while one depressurizes and one desorbs and one pressurizes under conditions of adiabatic pressure-swing.

12. The process of claim 11 wherein the separate stages are operated to overlap operation at the end of each cycle to insure a smooth transition within the system to thereby avoid pressure surges.

13. The process of claim 8 wherein the ratio of nitrogen to methane to carbon dioxide in the third overhead is such as to prevent solidification of said methane.

14. The process of claim 15 wherein the temperature of said third overhead after passing through said fifth, second and fourth heat exchangers is raised within the cryogenic ranges.

15. The process of claim 8 wherein the adsorption zone is preferably operated between 140° and 175°R.

16. The process of claim 8 wherein said recycle hydrogen is expanded to a temperature of about 100°R.

* * * * *